(12) United States Patent
Ong et al.

(10) Patent No.: US 8,509,800 B2
(45) Date of Patent: Aug. 13, 2013

(54) ADAPTIVE MOBILE VIDEO CALL CONGESTION CONTROL

(75) Inventors: Heong Yong Ong, Singapore (SG); Chee Guan Yap, Singapore (SG); Andre Yogasara, Singapore (SG)

(73) Assignee: Motorola Mobility LLC, Libertyville, IL (US)

( * ) Notice: Subject to any disclaimer, the term of this patent is extended or adjusted under 35 U.S.C. 154(b) by 820 days.

(21) Appl. No.: 12/262,332

(22) Filed: Oct. 31, 2008

(65) Prior Publication Data

US 2010/0113037 A1    May 6, 2010

(51) Int. Cl.
*H04W 72/00*    (2009.01)

(52) U.S. Cl.
USPC ................................. 455/452.2; 455/452.1

(58) Field of Classification Search
USPC .......................................... 455/452.1–452.2
See application file for complete search history.

(56) References Cited

U.S. PATENT DOCUMENTS

| | | | |
|---|---|---|---|
| 6,683,853 B1 * | 1/2004 | Kannas et al. ................. | 370/237 |
| 2003/0063569 A1 * | 4/2003 | Kalliokulju et al. .......... | 370/252 |
| 2004/0228291 A1 * | 11/2004 | Huslak et al. .................. | 370/260 |
| 2005/0149580 A1 * | 7/2005 | Hattori et al. ................. | 707/200 |
| 2005/0226193 A1 * | 10/2005 | Karhiniemi et al. .......... | 370/338 |
| 2006/0073824 A1 | 4/2006 | Ranganathan et al. | |
| 2010/0299433 A1 * | 11/2010 | De Boer et al. ............... | 709/224 |

FOREIGN PATENT DOCUMENTS

EP    1367779    12/2003

OTHER PUBLICATIONS

"New Congestion Control System for 3G FOMA Network", News feature from 3G.co.uk, dated Aug. 21, 2006.
Jeong, Dong Geun et al., "Congestion Control Schemes for Reverse Link Data Transmission in Multimedia CDMA Systems", IEEE Transactions on Vehicular Technology, vol. 52, Issue 6, Nov. 2003, pp. 1489-1496.
Kanakia, Hemant, et al., "An Adaptive Congestion Control Scheme for Real-Time Packet Video Transport", Association for Computing Machinery (ACM), SIGCOMM, Sep. 1993.
"Implementing QoS Solutions for H.323 Video Conferencing over IP", Cisco Systems, Inc., Document ID #21662, Mar. 3, 2005.
Kohler, E. et al., "Datagram Congestion Control Protocol (DCCP)", Network Working Group: The Internet Society, RFC4340, Mar. 2006.
Perkins, Colin, "Level 5 Projects", University of Glasgow, Department of Computing Science 2004-2005 Academic Year.

* cited by examiner

*Primary Examiner* — Jinsong Hu
*Assistant Examiner* — Michael Nguyen (57) ABSTRACT

Systems and methods are provided for adaptive control of call quality-of-service. Using the systems and methods, if the uplink of a given mobile station is congested, the quality of the data, e.g., video data, sent by the mobile station along its uplink is adjusted to allow an optimal number of calls to be transmitted through the congested location. A centralized base station controller (CBSC) may obtain congestion information, such as frame loss ratio or frame delay, from its portion of the mobile network. The CBSC then relays this information to a mobile station and/or to a CBSC associated with one or more mobile station(s) at the other end of the call. The mobile stations may then adapt the quality of the video conferencing accordingly. Using the disclosed systems and methods, bandwidth utilization may be improved, allowing a high number of calls to be completed, and reducing the occurrence of dropped calls.

7 Claims, 5 Drawing Sheets

ADAPTIVE MOBILE VIDEO CALL CONGESTION CONTROL

BACKGROUND

Wireless communication systems are widely used for many different purposes. These systems include mobile and cellular telephones and other wireless communication devices, and also include, but are not limited to, pagers, computers, and personal digital assistants (PDA's). These electronic devices and others are capable of receiving and transmitting information using a wireless communication system such as a cellular or mobile network.

A wireless communication system is a complex network of systems and elements. Typical elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller or switch, typically a mobile switching center (MSC), for routing calls within the system, and (5) a link to the land line or public switch telephone network (PSTN), which is usually also provided by the MSC.

As technology advances, users are employing wireless communication systems to place video calls rather than just voice calls. Video calls require significantly greater bandwidth and data capabilities as compared to voice calls. Accordingly, network congestion is a problem often encountered with video calls.

SUMMARY

The systems and methods disclosed provide adaptive control of call quality-of-service (QOS). In general, if the uplink originating from a given mobile station is congested, the quality of the video data sent by the mobile station along its uplink will be adjusted to allow an optimal number of calls to be transmitted through the congested location.

The call is generally a mobile video call, although voice-only calls may also benefit from the systems and methods disclosed. A CBSC may obtain congestion information, such as frame loss ratio or frame delay, from its portion of the mobile network. The CBSC then relays this information to a mobile station and/or to a CBSC associated with a mobile station at the other end of the call. The mobile stations may then adapt the video conferencing accordingly.

Using the disclosed systems and methods, bandwidth utilization may be improved, allowing a high number of calls to be completed, without dropped calls. The methods allow operators to utilize the network in the best way to balance customer's expectations, experiences, and needs. During low traffic periods, high-quality video ensures that users enjoy a high-quality call experience. During high traffic periods, a lower-quality video ensures that a large number of users may make calls simultaneously without excessive dropped calls. The lower-quality video may include, for example, less resolution or color. In some cases, switching to a voice-only call may occur. If particularly urgent, and during a high traffic period, users may choose to pay a premium for a high quality video call. Users may also subscribe to one or more payment plans that guarantee a certain level of call quality.

DETAILED DESCRIPTION

Figure 1:
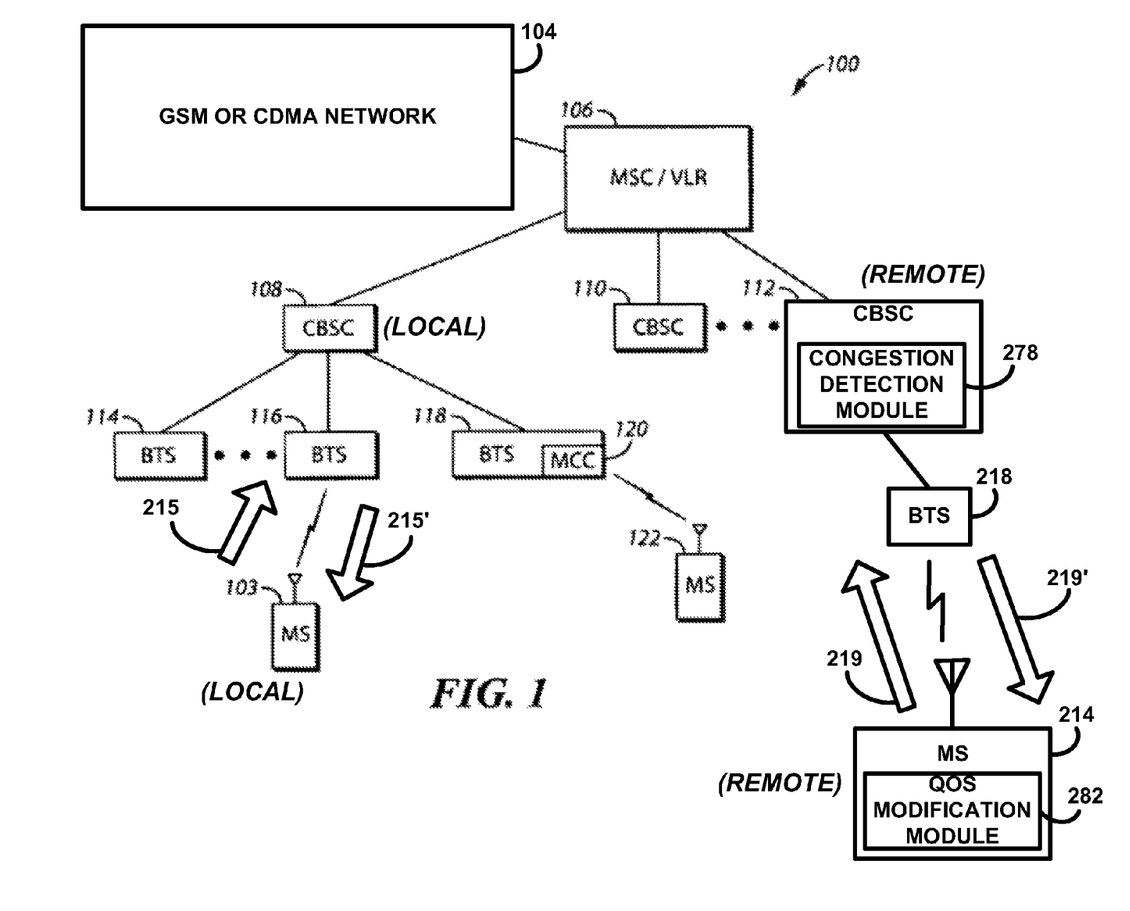
FIG. 1 is a schematic block diagram illustrating a system for controlling call quality to address network congestion, in particular illustrating a call between a local mobile station and a remote mobile station.

Referring to FIG. 1, a network environment 100 is described in which the system and method for controlling call quality, i.e., controlling transmission parameters of a mobile phone call based on network congestion, may be employed. The system and method may be implemented in a fashion that is transparent to the user. In this way, the user may occasionally encounter calls for which the quality of service is lower; however, a lessened occurrence of dropped calls will compensate for this. In other implementations, a level of user input is provided. For example, the users may select quality levels in their respective accounts using a web browser or by other means, which in some cases may be depend on how the user is notified by the network provider that congestion has arisen. As another example of user input, a user may be given a choice of levels of qualities of service at the time of making a call. These systems are described below.

The network environment 100 includes a mobile network 104, which may be a radio access network, for instance. The radio access network may provide an interface to a variety of services that are made available to mobile stations. Such services include voicemail services, Internet gateway services, instant messaging services, information services, and fax storage services. Other types of services are also possible. The radio access network is connected for packet-based communications to the Internet for transport of messages and data, and may include various types of messaging technologies such as Code Division Multiple Access (CDMA), Time Division Multiple Access (TDMA), Global System for Mobile Communications (GSM), and General Packet Radio Service (GPRS). Messaging technologies for video data may in particular be employed.

The network 104 is coupled to a mobile switching center (MSC)/visitor location register (VLR) 106. The purpose of the MSC/VLR 106 is to provide an interface between the base station system and the switching subsystem of the mobile phone network. The MSC/VLR 106 is coupled to a plurality of centralized base station controllers (CBSCs) 108, 110, and 112. The CBSC 108 is termed here a "local" CBSC and the CBSC 112 is termed a "remote" CBSC. Such terms are purely for explaining the system and method, and should not be viewed as limiting in any way. The CBSCs 108, 110, and 112 provide connectivity between base transceiver stations (BTSs) and the MSC/VLR 106. In the example shown in FIG. 1, the CBSC 108 provides connectivity between the BTSs 114, 116, 118 and the MSC/VLR 106. The CBSCs 110 and 112 also provide connectivity between their corresponding BTSs (only BTS 218 is shown) and the MSC/VLR 106. In some cases some or all of the functionality of the MSC/VLR 106 may be performed by the network 104, the CBSCs, or a combination of both the MSC/VLR 106 and the network 104.

The CBSCs generally service a given area, and handle signal compression and decompression, handoff determinations, and signal access determinations. Each CBSC may act as a switch and network interface, i.e., a backhaul interface.

Each of the BTSs 114, 116, 118, and 218 include a Multi-Channel Controller (MCC) 120. In this case, only the MCC 120 associated with the BTS 118 is shown. The MCC 120 connects the BTS 118 with the mobile stations. In one example, the MCC 120 connects the BTS 118 with the mobile station (MS) 122. The BTS 118 provides the control and transmission functionality needed to wirelessly communicate with the MS 122. Messages are exchanged between the BTS 118 and an MS 122, and in FIG. 1 also between BTS 116 and MS 103. Similarly, the BTS 218 provides the control and transmission functionality needed to wirelessly communicate with the MS 214.

Additional details concerning the transmission of messages between a BTS and an MS are disclosed in, e.g., U.S. Patent Application Publication 2006/0073824A1, Ser. No. 10/953,333, filed Sep. 29, 2004, owned by the assignee of the present invention and herein incorporated by reference in its entirety.

Consistent with the terminology used to describe the CBSCs, the MS 103 is denoted a "local" mobile station and the MS 214 is denoted a "remote" mobile station. With respect to the local MS 103, the CBSC 108 is the local CBSC and the CBSC 112 is the remote CBSC. The local MS 103 communicates with the local CBSC 108 (through BTS 116) via a first link including an originating uplink 215 and a downlink 215', and the remote MS 214 communicates with the corresponding remote CBSC 112 (through BTS 218) via a second link including an uplink 219 and a downlink 219'. The local CBSC 108 and the remote CBSC 112 communicate with each other through the MSC 106 or through the network 104 coupled to the MSC. The uplink 215 and the downlink 219' form a transmission path from the MS 103 to the MS 214, along with communications links between the BTS 116/CBSC 108 and the BTS 218/CBSC 112. The uplink 219 and the downlink 215' form a transmission path from the MS 214 to the MS 103, along with communications links between the remote BTS 218/CBSC 112 and the local BTS 116/CBSC 108. In some implementations, the local MS may communicate with two or more remote mobile stations, and vice-versa.

FIG. 1 also illustrates a congestion detection module 278 and a quality of service (QOS) modification or adjustment module 282, either or both of which may be implemented in hardware, firmware, software (such as on a computer-readable medium), or the like. The congestion detection module 278 may be located in the local CBSC 108, the remote CBSC 112, or at any point in-between, e.g., as part of an MSC 106. In certain systems, a portion of the congestion detection module 278 is disposed in one location and another in a different location, and the two may work together via a suitable controller and communications medium to effect or result in the functionality of the module.

The QOS modification module 282 is generally located within an MS, and in FIG. 1 is shown within the remote MS 214. In this way, communications data, such as audio or video, may be transmitted in a reduced-QOS manner. While the QOS modification module 282 is shown in FIG. 1 as a single separate module, its functionality may be in part implemented by one or more pre-existing components of the MS 214. The QOS modification module 282 performs its functions upon receipt of a signal indicating network congestion, where the signal is sent by another of the network components, such as one of the CBSCs.

Figure 2:
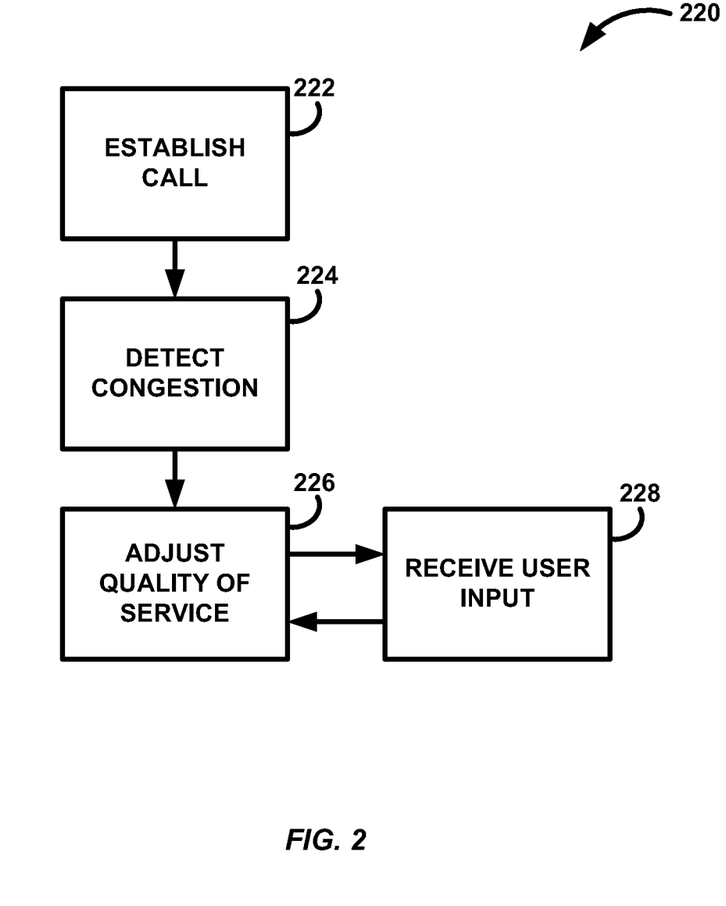
FIG. 2 is a flowchart illustrating a method for controlling call quality to address network congestion.

In FIG. 2 a flowchart is shown for a method 220 for controlling call quality based on network congestion. This figure details the method in summary fashion—details are provided in the two following figures. A first step of the method is to establish a mobile phone call (step 222). The next step is to detect a level of congestion at some point along the transmission path between two mobile stations (step 224). The QOS, which may be video or voice QOS or both, may then be adjusted (step 226). A step of user input (step 228) is also shown. The user input may take many forms, as shown by various dotted lines. In one implementation, as indicated by the top dotted line 221, the user may specify, prior to the time a call is made, that they desire a guaranteed level of quality. For example, the user may have purchased a calling plan that guarantees this level of quality, and the guarantees of the calling plan are repeated monthly. In some cases, businesses may desire such a plan as the cost may be made constant on a month-by-month basis. In another implementation, as indicated by the bottom dotted line 223, the user may specify at the time of the call the quality they desire. For example, upon making a call, a user interface on the mobile station may indicate that the network is congested and that QOS is being reduced. However, the user may be given an option in such circumstances to obtain their original QOS in exchange for payment of a premium. On the other hand, the user may be given the option of reducing the QOS still further, in exchange for an additional cost savings.

Figure 3:
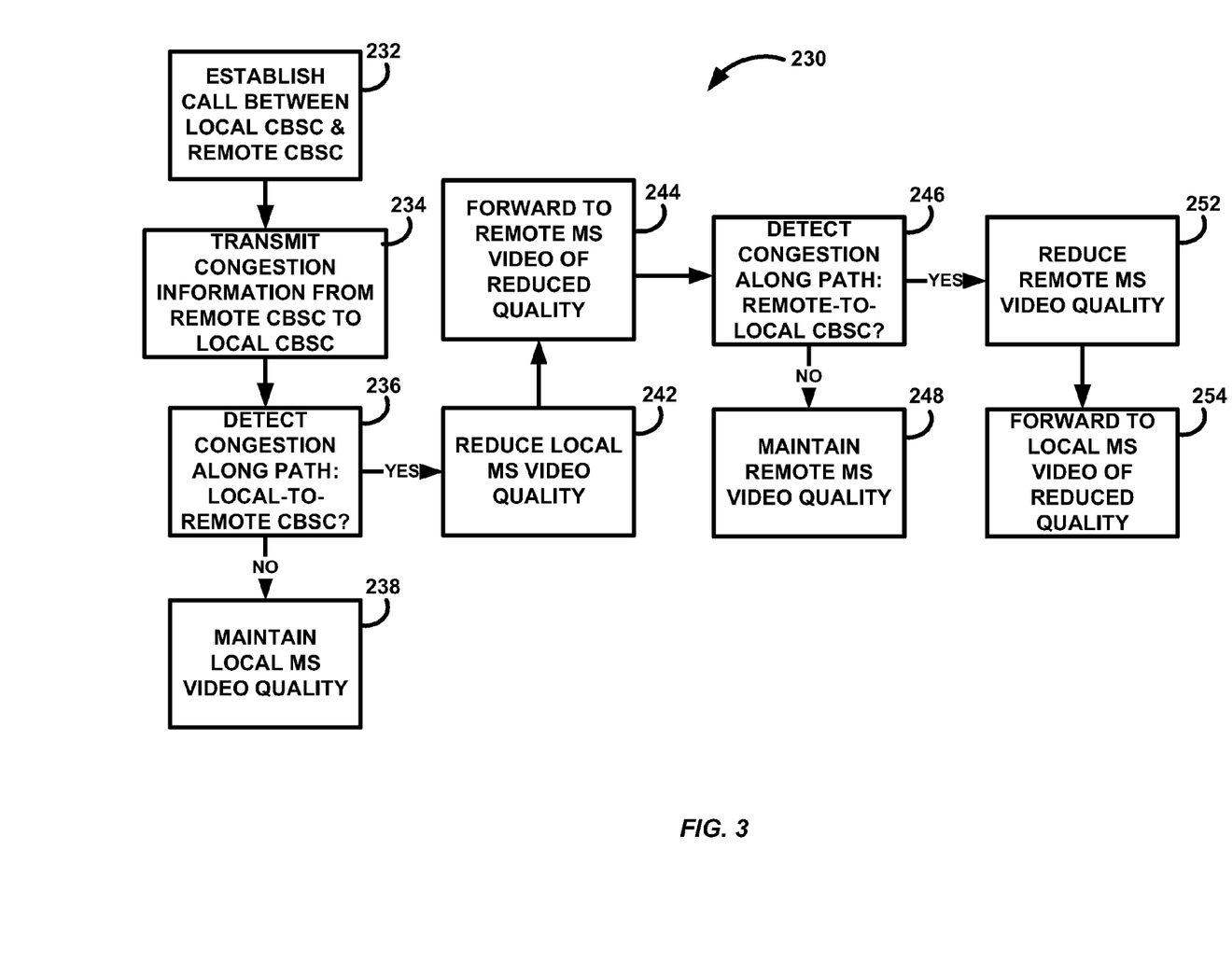
FIG. 3 is a more detailed flowchart illustrating a method for controlling call quality to address network congestion, in which a remote CBSC detects network congestion.
Figure 4:
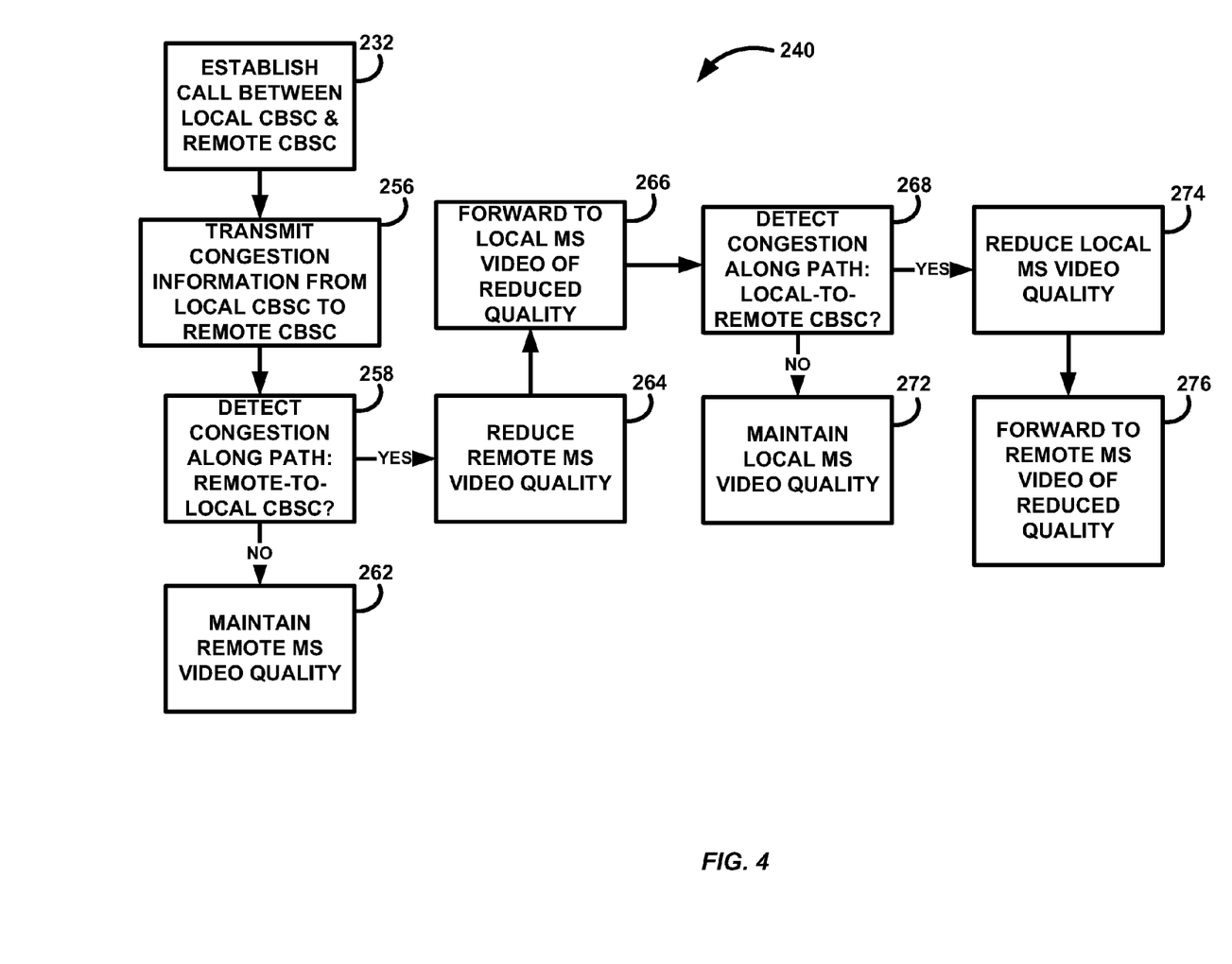
FIG. 4 is another more detailed flowchart illustrating a method for controlling call quality to address network congestion, in which a local CBSC detects network congestion.

Referring to the more detailed FIG. 3, a method 230 is illustrated in flowchart form that describes a situation in which the remote CBSC detects a level of congestion of a mobile network along a transmission path between a local mobile station and a remote mobile station (an alternative situation in which the local CBSC detects congestion is shown in FIG. 4). More generally, of course, the congestion may be detected by the local CBSC, the remote CBSC, or both, or in some cases by another network element. CBSC are generally able to monitor a variety of frame loss and delay information, as will be described below, and this information can be relayed across the radio access network, traveling through various network interfaces.

Depending on where the congestion is detected, necessary quality adjustments may be made. If congestion is detected along only one direction, then the congestion control need only take place along that direction. In other words, the mobile station originating from that direction may adjust its QOS to a lower value. If congestion is detected along both directions, then congestion control may be implemented in both directions.

Referring again to FIG. 3, a call is established between a local mobile station and a remote mobile station. This call establishes message communication between an associated local CBSC and an associated remote CBSC (step 232). In the example of FIG. 3, the congested path is that from the local to the remote MS, and the remote CBSC detects the congestion (step 234). The local CBSC may detect the congestion as well, but for the congested path of FIG. 3, the remote CBSC is privy to more of the total path congestion information, and thus is more likely to detect congestion. In so doing, the remote CBSC determines if the path including the link from the local to the remote CBSC is congested (step 236).

The remote CBSC transmits a signal corresponding to congestion information (step 241) to the local MS, including a signal indicating no congestion if appropriate (not shown in FIG. 3). In some implementations, the remote CBSC only transmits notifications of congested areas, instead of both congested and non-congested, and these notifications may be sent to mobile stations associated with the remote CBSC as well as to other CBSCs.

In this determination, the remote CBSC calculates if the level of congestion along one of the links between the MS and its associated BTS is greater than a predetermined threshold. For example, the remote CBSC may have detected an increased frame loss ratio, where this is defined as, within a certain duration of measurement, the ratio of the packet frames lost (e.g., when a check sum fails) to the total number of frames received. Alternatively, the remote CBSC may have detected an increased frame delay, where this is defined as, within a certain duration of measurement, the average delays experienced by packet frames when transiting from source to destination.

Another parameter that may be employed is the frame erasure rate, which is defined as, within a certain duration of measurement, the ratio of bad, e.g., corrupt, frames to the total number of frames received. This parameter is measured over the air interface between the mobile unit and the CBSC. Yet another parameter that may be employed is jitter, which relates to the variation of packet frame delays. High jitter will usually result in non-uniform video presentation, as the packets arrive with different delays.

In certain implementations, combinations of the above techniques may be employed to detect levels of congestion. In some systems, using a combination allows congestion detection where the congestion may not appear in one or another measure. Alternatively, use of a combination may be appropriate where one technique lacks the necessary accuracy to provide an accurate estimate by itself. In an implementation employing a combination of techniques, different thresholds may be applied to each as may be appropriate given the parameter measured. In one example, where the thresholds are significantly different, one technique may provide a coarse estimate, another a fine estimate, and so on.

If the CBSC determines that the level of congestion exceeds the predetermined threshold, then a signal is sent to the local or remote mobile stations, or both, according to which link has the congestion. In FIG. 3, the signal is sent to the local MS. The CBSC may also communicate the congestion detection to the other (or any number of other) CBSC(s). The signal may result in automatic QOS reduction or a user-selectable QOS reduction, as described below. In either case, a change is made to a quality level of data transmitted by the mobile station along the uplink.

Communication of such signals or messages among CBSCs may generally require employing a suitable application layer protocol. In one implementation, RTP/RTCP may be employed in an overlay above, e.g., a UDP-type protocol at the Transport Layer. The messages or other such data packets may contain time stamp information and sequence numbers for the associated video call traffic. Analysis of the time stamp information and sequence numbers provides the parameters noted above.

If no congestion is detected along the transmission path, or if the detected congestion is below a predetermined threshold, then no adjustment of QOS, e.g., video QOS, is made (step 238).

If there is congestion along the transmission path, or if the detected congestion is greater than or equal to a predetermined threshold, then as noted above a signal is transmitted to the MS indicating that the same should reduce its QOS (step 241). An adjustment of QOS is made (step 242) by the MS. This adjustment may be automatic or may involve user input. If automatic, the device may automatically upgrade or downgrade the video quality, subject to certain parameters which may be user-determinable prior to the call being made. For example, users may set their account parameters such that they always require, and optionally pay for, a full-color video call. In another implementation, a user may set their account to always opt for a high-quality voice call over a low-quality video call. Numerous variations will be apparent, and these are indicated by the dotted line 221 in FIG. 2. The setting of account parameters may take place in some cases on a web browser or on the device itself.

The video QOS may also be chosen by the user at the time of the call, and this is indicated by the dotted line 223 in FIG. 2. If the level of congestion exceeds the predetermined threshold, a signal may be sent by a CBSC and received by the mobile station. The signal causes a user-selectable option to be rendered on a user interface of the mobile station. The user-selectable option allows the user to reduce a quality level of data transmitted along the first or second link. The option may be rendered as a graphical display shown on the display screen of the mobile station. The graphical display may present various options for QOS reduction. The user-selectable option may also be rendered in an audible manner so that, for instance, the user may listen to various options on an earpiece of the mobile station prior to selection. Selection of the user-selectable option then causes the QOS to be adjusted in accordance with the selection.

To enable user input, either for setting account parameters on a device or for the choice of options at the time of a call, a software menu may be provided on the local mobile station or on the remote mobile station as appropriate. The software menu may be displayed, e.g., during roaming carrier selection. The menu can allow the mobile subscriber to specify certain criteria, such as desired cost, performance, service availability, and so on. The software then attempts to provide the call with the desired parameters subject to the other requirements of the system. The software may also provide a way for the user to choose the QOS they desire, e.g., from a list of menu choices.

In some cases, a higher QOS may be obtained with, e.g., a user premium payment for such accommodation. As noted above, the user may also pay the premium for the higher video QOS in advance. In another implementation, the user may experiment with various settings during a call, to see which results in the best video quality, for instance.

The adjustment to the QOS may be minor or may be substantial. For example, to address minor congestion, a minor reduction in QOS may occur. To address substantial congestion, a large reduction in QOS may occur or the call, if a video call, may be transformed into a voice-only call. A minimum video quality may be set such that, when congestion requires a reduction below the same, the call may be transformed into a voice-only call.

The threshold levels of network congestion need not be defined by a single value. The local mobile station or the remote mobile station may be configured such that one or more, such as two, predetermined set points are defined or otherwise pre-determined, for any of the congestion parameters noted, e.g., frame loss ratio, frame delay, or the like. These set points may then define an upper and a lower bound. Between the upper and lower bound may be defined a range of acceptable congestion for a given video QOS configuration, e.g., for a configuration of 16 bit, 320×240, and 30 fps. If the congestion is within the range, then the video QOS remains unchanged. If the congestion is greater than the upper bound, then the video QOS is reduced. If the congestion is lower than the lower bound, then the video QOS may stay the same or may even be caused to increase. In some cases, the video QOS may be returned to an original level.

Video QOS may be decreased or increased, in a step fashion, and the gradations may be taken in more than one type of video parameter. For example, the color depth, the frame size, and the frame interval may each be individually or in combination graduated to address congestion. Regarding the color depth, steps may be, e.g., 32-bit, then 16-bit, then 8-bit, and then grey scale. Regarding the frame size, the steps may be, e.g., 640×480, then 320×240, then 160×120, and so on. Regarding the frame interval, the steps may be, e.g., 30 frames per second, then 15 frames per second, and so on.

The effect is to cause the source mobile stations to send progressively lower qualities of video; this reduces the downlink bandwidth and has the ancillary benefit of helping to reduce dropped calls. The lower video QOS then propagates from the air interface and up to the network, thus helping to reduce congestion within the radio access network.

Returning to FIG. 3, the next step is the forwarding of the call or message data to the remote mobile station (step 244). Congestion may also be detected along the reverse path, which in this case is the path from the remote mobile station to the local mobile station. If there is no congestion along that transmission path, or if the detected congestion is below a predetermined threshold, then no adjustment of video QOS is made (step 248) in that direction.

If there is congestion along that transmission path, or if the detected congestion is greater than or equal to a predetermined threshold, then an adjustment of video QOS is made (step 252), which again may be automatic or may involve user input. The method is completed when the call or message data is forwarded to the local mobile station (step 254).

Referring to FIG. 4, another method 240 is illustrated: in this figure, the local CBSC detects the congestion. As before, a call is established between a local mobile station and a remote mobile station, establishing message communication between an associated local CBSC and an associated remote CBSC (step 232). In FIG. 4, the local CBSC detects congestion information among calls routed through the same, and transmits such congestion information to one or more mobile stations associated with congested links. For example, the congestion information may be transmitted, if appropriate, as pertaining to the path including the link from the remote CBSC to the local CBSC. It is also noted that the congestion information may be transmitted to one or more other CBSCs.

Steps of the method of FIG. 4 are generally similar to those of FIG. 3. Following the establishment of the call (step 232), congestion information is detected, including along the transmission path from the remote CBSC to the local CBSC (step 256). If the detected congestion is below a predetermined threshold, then no adjustment of QOS is made (step 262). If the detected congestion is greater than or equal to a predetermined threshold, then a signal is transmitted from the CBSC to the local MS (step 263). Upon receipt of the signal, an adjustment of QOS is made (step 264), which may be automatic or may involve user input as described. The call or message data is then forwarded to the remote mobile station (step 266). Congestion may then be detected along the reverse path, which in this case is the path from the local mobile station to the remote mobile station. If the detected congestion is below a predetermined threshold, then no adjustment of QOS is made (step 272). If there is congestion along that transmission path, then an adjustment of QOS is made (step 274), which again may be automatic or may involve user input. The method is completed when the call or message data is forwarded to the remote mobile station (step 276).

In any case, if network congestion clears, the video or other data may be transmitted at a higher or at the originally-transmitted level of quality, i.e., that employed prior to the network congestion control, rather than at the reduced QOS.

Figure 5:
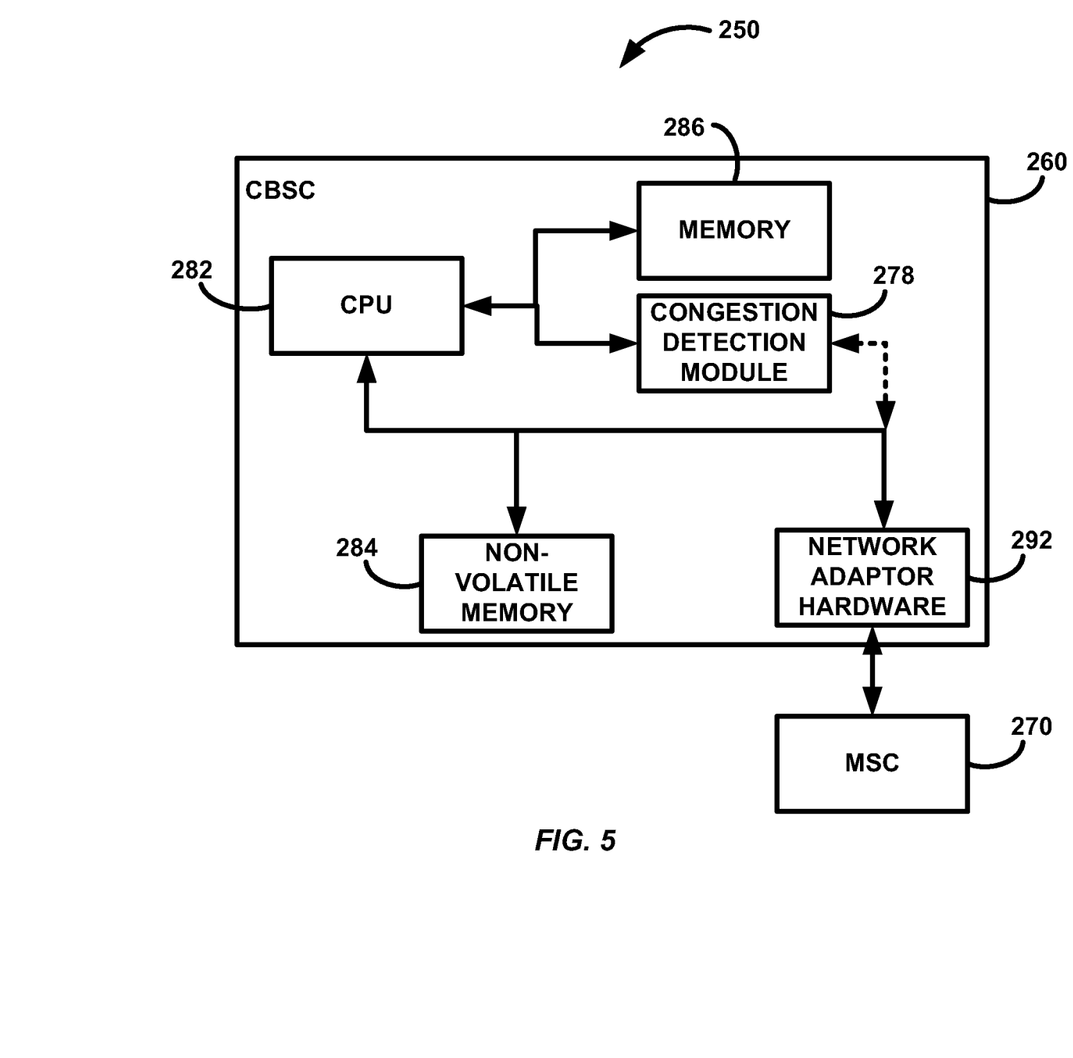
FIG. 5 is a schematic block diagram of a base station controller.

FIG. 5 is a block diagram illustrating a detailed view of a CBSC 260, such as the CBSC 108, 110 or 112 of FIG. 1. The CBSC 260, in one embodiment, resides outside of and is communicatively coupled to one or more BTSs, as shown in FIG. 1. In other embodiments, the CBSC 260 resides within a BTS. The CBSC 260 includes a processor/controller 282 that is communicatively connected to a main memory 286 (e.g., volatile memory), a non-volatile memory 284, and a network adaptor hardware 292 that is used to provide an interface (i.e., input/output) to an MSC 270, such as MSC 106 in FIG. 1. The MSC 270 in turn communicates with the network.

A congestion detection module 278 receives congestion information and determines if a signal should be sent to a mobile device for an adjustment of QOS. The congestion detection module 278 may be a separate circuit or may be an application implemented in software and stored in a memory of the CBSC 260. The same may receive data from the processor/controller 282 and/or from the network adaptor hardware 292 (indicated by a dotted line), and this data may be employed to determine if congestion is present.

The processes described above, including but not limited to those presented in connection with FIGS. 2-5, may be implemented in general, multi-purpose or single purpose processors. Such a processor will execute instructions, either at the assembly, compiled or machine-level, to perform that process. Those instructions can be written by one of ordinary skill in the art following the description as presented above and stored or transmitted on a computer readable medium. The instructions may also be created using source code or any other known computer-aided design tool. A computer-readable medium may be any medium capable of carrying those instructions and may include a CD-ROM, DVD, magnetic or other optical disc, tape, silicon memory (e.g., removable, non-removable, volatile or non-volatile), packetized or non-packetized wireline or wireless transmission signals.

A method and apparatus has been described for adaptively adjusting quality of service for control of call congestion by sending a signal from a CBSC to a mobile station to adjust its video (or audio) QOS in the event of congestion in its associated uplink. As a result, congestion is minimized and a greater number of calls may be accommodated. Among its other advantages, the occurrence of dropped calls is lessened.

Variations of the above description will be apparent to one of skill in the art given this teaching. While the system and method have primarily been described in the context of reducing the QOS of video calls, the same may also be employed to reduce the QOS of voice calls to mitigate network congestion. Moreover, certain feedback and/or adjustment techniques may be employed to avoid unnecessary QOS adjustments. These techniques may include, e.g., the types of algorithms found in CDMA power control.

While the invention has been described with respect to certain embodiments, it should be clear to one of ordinary skill in the art, given this teaching, that the invention is much broader than the embodiments shown. Accordingly, the description represents some, but not all, representations, and therefore the scope of this invention is to be limited only by the claims appended to this description.

What is claimed is:

1. A method of controlling transmission parameters of a mobile phone call, comprising:
   a. detecting a level of congestion along a transmission path over which the mobile phone call is established between a local mobile station and a remote mobile station, the transmission path being either;

i. a first link, from the local mobile station to the remote mobile station; or ii. a second link, from the remote mobile station to the local mobile station;

b. if the level of congestion along the first or second link, or both, is greater than or equal to a predetermined threshold, sending a signal to the local mobile station, the remote mobile station, or both, the signal instructing the local mobile station, the remote mobile station, or both, to reduce an associated quality of service so that the level of congestion is thereby reduced, said signal causing a plurality of user-selectable quality-of-service options to be rendered on or by a user interface of the local mobile station or the remote mobile station, or both, such that a reduction in a quality level of data transmitted along the first or second link, or both, can be selectively implemented by a user, each of the quality-of-service options specifying a different reduced quality-of-service level at which the data can be transmitted during the mobile phone call; and wherein the mobile phone call is a video phone call and the user-selectable quality-of-service options present a user with a plurality of video quality-of-service levels from which to select, and further comprising receiving a selection of one of the quality-of-service levels and adjusting the video quality-of-service to the selected one of the levels in response thereto.

2. The method of claim 1, wherein the level of congestion is indicated by a level of frame delay or a level of frame loss ratio.

3. The method of claim 1, wherein the detecting is performed by a congestion detection module associated with a centralized base station controller, and further comprising transmitting a signal from the centralized base station controller indicating the level of congestion to another centralized base station controller.

4. The method of claim 1, wherein one of the user-selectable quality-of-service options is a high quality-of-service associated with a premium payment that ensures that a high quality-of-service is provided or maintained.

5. The method of claim 1, further comprising receiving a selection of one of the quality-of-service levels, wherein the selection causes a reduction in the quality level of data transmitted along the first or second link, or both, by switching from a video phone call to a voice-only phone call.

6. The method of claim 1, wherein one of the user-selectable quality-of-service options reduces at least one video parameter selected from the group consisting of color depth, frame size and frame interval.

7. A method of controlling transmission parameters of a mobile phone call, comprising:

a. detecting a level of congestion along a transmission path over which the mobile phone call is established between a local mobile station and a remote mobile station, the transmission path being either;

i. a first link, from the local mobile station to the remote mobile station; or ii. a second link, from the remote mobile station to the local mobile station;

b. if the level of congestion along the first or second link, or both, is greater than or equal to a predetermined threshold, sending a signal to the local mobile station, the remote mobile station, or both, the signal instructing the local mobile station, the remote mobile station, or both, to reduce an associated quality of service so that the level of congestion is thereby reduced, said signal causing a plurality of user-selectable quality-of-service options to be rendered on or by a user interface of the local mobile station or the remote mobile station, or both, such that a reduction in a quality level of data transmitted along the first or second link, or both, can be selectively implemented by a user, each of the quality-of-service options specifying a different reduced quality-of-service level at which the data can be transmitted during the mobile phone call, wherein one of the user-selectable quality-of-service options reduces at least one video parameter selected from the group consisting of color depth, frame size and frame interval.

* * * * *